April 20, 1937.  J. B. BRUSH  2,077,670
SWITCHING DEVICE FOR VEHICLE SIGNALS
Filed May 23, 1936
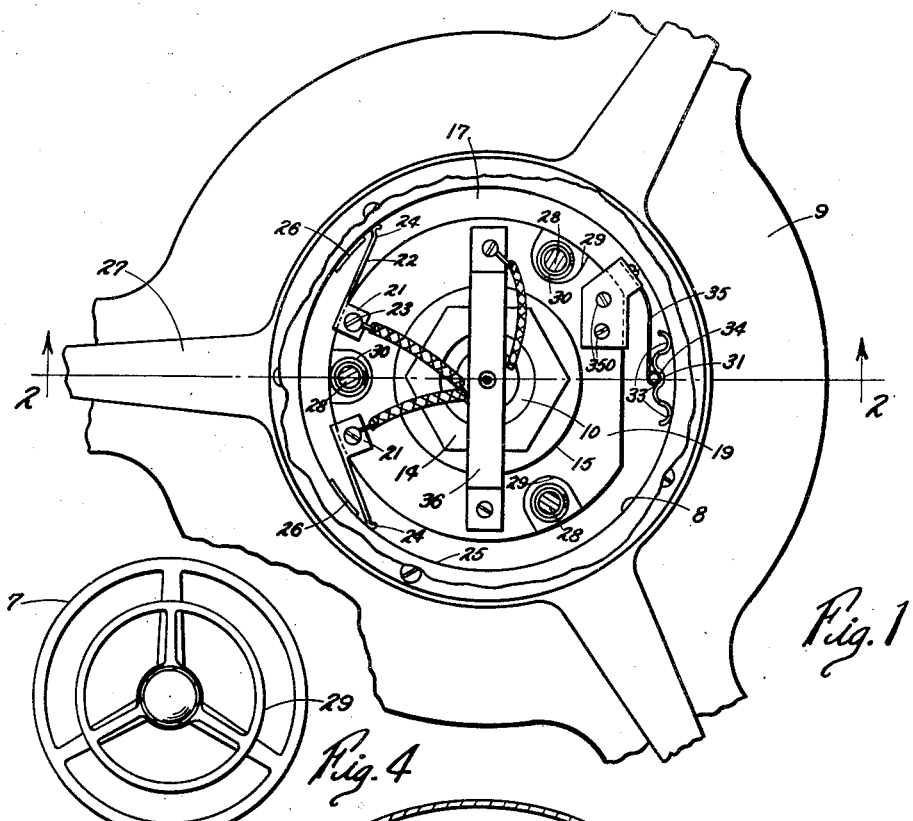
Fig. 1
Fig. 4
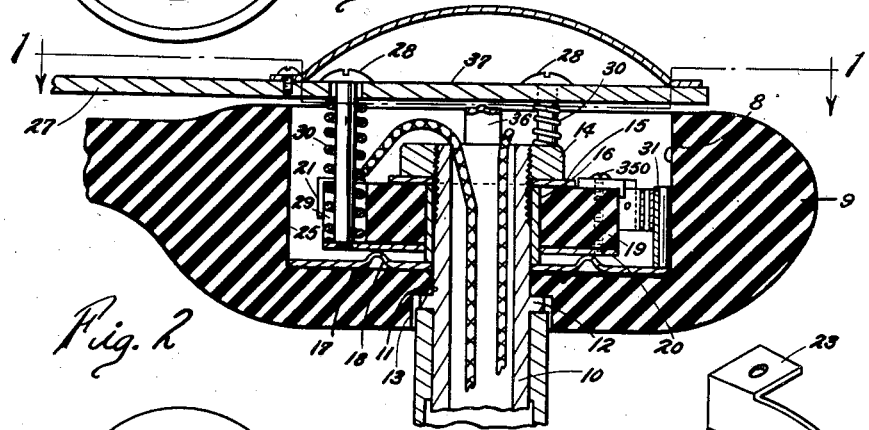
Fig. 2
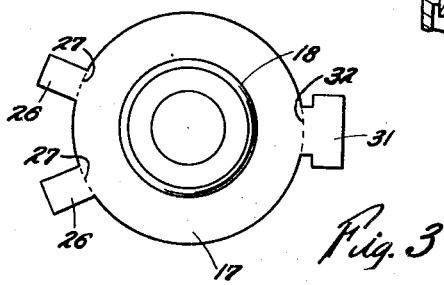
Fig. 3
Fig. 5
INVENTOR.
John B. Brush
BY
ATTORNEYS Patented Apr. 20, 1937

2,077,670

UNITED STATES PATENT OFFICE 2,077,670

SWITCHING DEVICE FOR VEHICLE SIGNALS

John B. Brush, Cincinnati, Ohio

Application May 23, 1936, Serial No. 81,475

2 Claims. (Cl. 200—59)

The present invention relates to a switching device for controlling a number of electric circuits and particularly to its construction as applied to vehicle steering wheels and the like.

An object of the invention is to provide an improved switching device employing a novel grounding plate, which has a number of peripheral projections which are adapted to engage movable contacts to complete electric circuits.

Another object of the invention is to provide a switching device which employs a few simplified moving parts that function positively, without friction or noticeable effort on the operator's part, and harmoniously match present day plain steering wheel construction.

A further object of the invention is to provide a device which may be conveniently operated by the driver of the automobile upon which it is employed, without the removal of his hands from the steering wheel.

Other objects will be apparent from the specification and drawing, in which:

Fig. 1 is a fragmental plan view of the switching device, part of the inner ring member being broken away to disclose the working parts thereof, the view being taken on line 1—1 of Fig. 2.

Fig. 2 is a cross sectional view taken on line 2—2 of Fig. 1.

Fig. 3 is a plan view of a blank which forms the novel grounding plate of the switch.

Fig. 4 is a plan view of the device in operative position.

Fig. 5 is a perspective view of the spring contact of the device.

Generally, my switching device comprises an inner ring member, mounted adjacent the steering wheel of an automobile so that it is accessible to the fingers of the driver thereof without involving the removal of his hands from the wheel. The ring is adapted to rotate with the wheel whilst being capable of a small independent, rotary movement which is transmitted to an insulation block freely mounted on the steering shaft and housed in a recess in the hub of the wheel. The block has two spring contacts positioned thereon, one of which engages the ground contact of a circuit when the ring member reaches either predetermined limit of its rotary movement. The ring member is also provided with a small vertical movement, relative to the block member, which is adapted to open and close an additional circuit. As herein set forth the switching device is described in conjunction with an automobile so that the movement of the ring member may operate a left or right turn direction signal when the ring is rotated to the left or right, respectively. Whilst the vertical movement of the ring member is adapted to sound a warning signal.

The embodiment of my invention consists of a conventional steering wheel 7 provided with a cylindrical recess 8 formed centrally of the hub portion 9. A tubular splined steering shaft 10 is received in a circular opening 11 in the hub portion of the wheel and extends centrally into the recess. The wheel is securely mounted on the shaft by providing a shoulder 12, located in the shaft, which engages the inner surface of a recess 13 in the bottom of the hub. A nut 14, threaded to the end of the shaft is designed to lock the shoulder against the recess by a clamping action imparted through a washer 15 and a sleeve 16 located between the nut and the wheel and shaft engagement.

A metallic circular plate 17 having the same circumference as the recess 8 is rigidly positioned on the bottom thereof by means of the clamping action of the sleeve 16 under which it is positioned. An annular offset 18 stamped in the circular plate provides a frictional surface for the movement of a rotatable member 19 positioned thereon. The rotatable member is preferably disk shaped in form and made of an electrically non-conducting substance. A metal plate 20, positioned on the bottom of the disk is bonded or bolted thereto and engages the offset 18, the washer 15 providing the necessary upper bearing for the rotatable member.

Two signal circuit contacts 21 (Figs. 1 and 5) having outwardly urged resilient arms are positioned on the rotatable member by bolts 23. The arms are provided with rounded ends 24 which normally engage the vertical side wall 25 of the recess 8. Two conductors 26 projecting from the periphery of the circular plate (Fig. 3) are turned at right angles to the plate, along a line 27 to the end that they are located against the vertical side wall 25 of the recess, as shown in Fig. 1.

These conductors are grounded to the steering shaft 10 through the clamping action of the sleeve 16 exerted on the circular plate. It will be seen that with each clock-wise or counter-clock-wise movement of the rotatable member (Fig. 1) one contact will be closed and that when the rotatable member is in neutral position (as shown) both pairs of contacts will be open.

A manually operated means such as an inner ring member 27 is positioned adjacent the steering wheel and preferably actuates the rotatable member by means of bolts 28, disposed centrally of the ring member and threaded to the metal plate 20 of the rotatable member, recesses 29 being provided in the disk to allow necessary clearance for the bolts. The rotatable member and the inner ring member are held in resilient spaced relationship by means of expansion springs 30 which engage the adjacent surfaces of both members.

The rotatable member and its actuating element, the inner ring member, are intended to rotate simultaneously with the steering wheel. This is accomplished by providing a positioning means which conveniently takes the form of a lug 31, projecting from the rigid circular plate (Figs. 2 and 3), and which is bent at right angles to the plate along the line 32, to take a position against the vertical side wall of the recess. Three stops 33 (Fig. 1) are stamped into the lug which receive a rounded portion 34 formed in the free end of an outwardly urged spring 35 carried by the rotatable member. The central stop is designed to hold the rotatable member in a normal position so that both of the signal circuit contacts and conductors are disengaged. The outer stops hold the rotatable member in position to engage either set of conductors and signal circuit contacts when the member is actuated by the inner ring member. The positioning arm also provides a definite ground for metallic plate 20 through bolts 35a.

The device as set forth is suitably adapted to control right and left turn signals for vehicles. As illustrated in Fig. 1, a counterclockwise movement from normal position as shown, imparted to the inner ring member will close one set of contacts to complete a circuit for a left turn vehicle signal whilst a clockwise movement from normal position may suitably close a right turn signal. The device is also provided with a bracket 36 positioned on the insulated portion of the rotatable member which may be connected with a vehicle horn signal to act as a circuit contact for the same. A suitable ground contact is set up for the portion 37 of the inner ring member adjacent the bracket by its contact with bolts 28, which latter engage the metallic plate 20 and grounds through positioning arm 35 and plate 17 to steering shaft 10. As has been said, the inner ring member and the rotatable member are held in resilient spaced relationship such that the inner ring member is capable of vertical movement. By depressing or raising the periphery of the ring, its portion above the contact 36 engages the contact to close the horn circuit. It is to be understood that the signals operated by my device are merely set forth for purposes of illustration, the device being suitable for other similar circuits used on vehicles.

What I claim is:

1. In an electric switch device for vehicle signals comprising a steering wheel having a centrally disposed recess in the hub portion thereof, a steering shaft for supporting the same and extending centrally into the recess, a circular plate, having an annular offset, rigidly positioned on the bottom of the recess and grounded to the steering shaft, a rotatable disk-shaped member mounted on the shaft and adapted to frictionally engage the offset in the circular plate, a manually operated inner ring member positioned adjacent the steering wheel and adapted to actuate the rotatable member in a clockwise or counterclockwise direction, a positioning lug projecting from the periphery of the circular plate and disposed against the vertical wall of the inset, a positioning spring mounted on the rotatable disk-shaped member and adapted to engage the positioning lug, said lug and spring cooperating to limit the movement of the rotatable member, a plurality of conductors projecting from the periphery of the circular plate and disposed against the vertical wall of the inset, a plurality of signal circuit contacts carried by the rotatable member and adapted to engage the conductors when the rotatable member is actuated to either limit of its movement, means for holding the disk-shaped rotatable member and the inner ring member in resilient spaced relationship and means for closing an independent circuit when the periphery of the inner ring member is depressed or raised.

2. In an electric switch device for vehicle signals, comprising a steering wheel, a cylindrical recess formed in the hub portion of the steering wheel, a steering shaft fastened to the steering wheel and extending centrally into the recess, a circular plate rigidly positioned on the bottom of the recess and grounded through the steering shaft, a rotatable member mounted on the shaft within the recess and adapted to frictionally engage the circular plate, means for retaining the rotatable member in predetermined positions, an inner ring member positioned adjacent to the steering wheel, and adapted to actuate the rotatable member, means for holding the inner ring member and the rotatable member in resilient spaced relationship, a plurality of conductors projecting from the periphery of the circular plate and positioned against the vertical wall of the inset, a plurality of signal circuit contacts carried by the rotatable member and adapted to engage the conductors when the rotatable member is actuated and means for closing an independent circuit when the periphery of the inner ring member is depressed or raised.

JOHN B. BRUSH.